Feb. 14, 1967            D. L. SOUTHAM            3,303,646
REDUNDANT BINARY TURBOELECTRIC POWER SYSTEM
Filed May 13, 1965
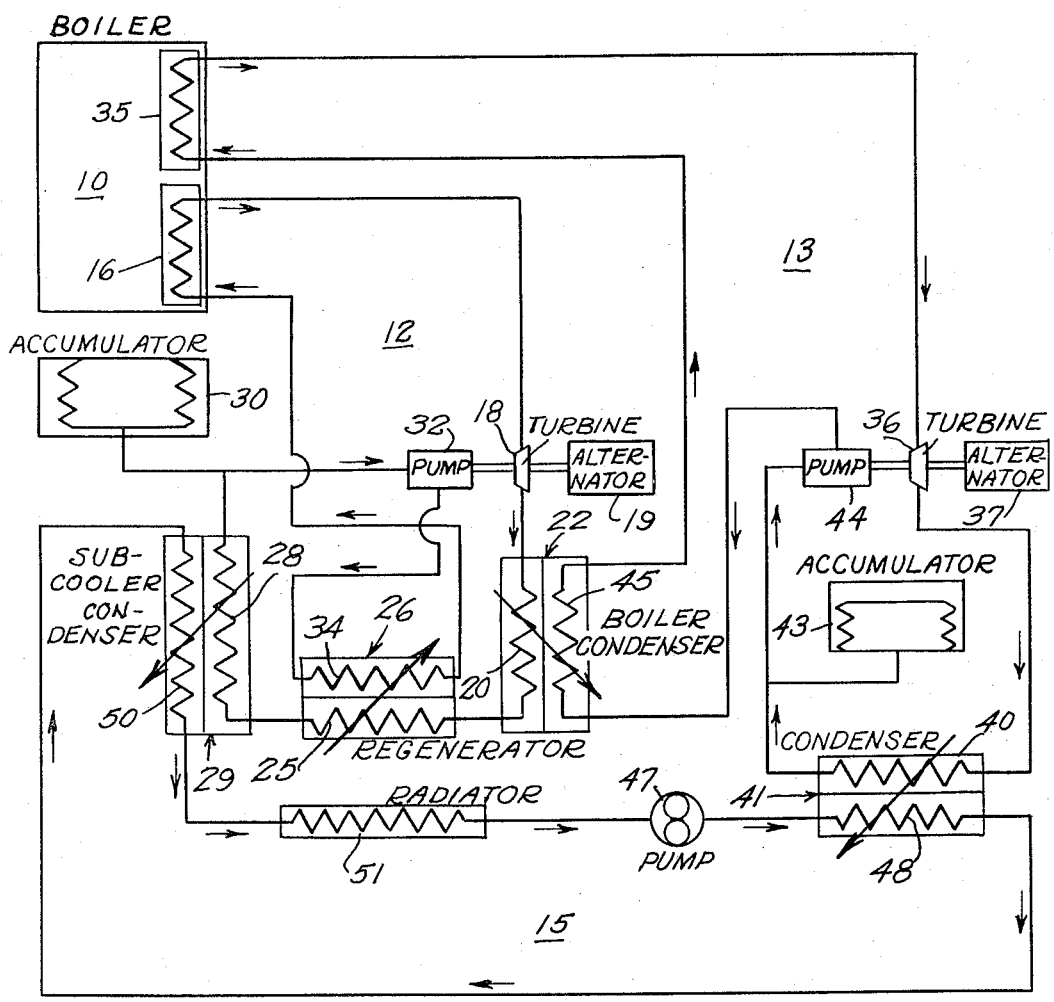
INVENTOR.
Donald L. Southam
BY     Hill, Sherman, Meroni, Gross Simpson     ATTORNEYS

United States Patent Office 3,303,646
Patented Feb. 14, 1967

3,303,646
REDUNDANT BINARY TURBOELECTRIC
POWER SYSTEM
Donald L. Southam, Cleveland Heights, Ohio, assignor to
TRW Inc., a corporation of Ohio
Filed May 13, 1965, Ser. No. 455,436
5 Claims. (Cl. 60—49)

This invention relates to a power delivery system, and particularly to a redundant power delivery system which utilizes the principle of a binary Rankine cycle to drive power delivery means, thereby converting thermal energy to electrical energy.

An object of the invention is to provide a binary power delivery system which has redundant power delivery means to deliver power to a common power utilization device.

Another object of the present invention is to provide a power delivery system which utilizes the principle of a binary Rankine cycle.

Another object of the present invention is to provide a power delivery system using a binary Rankine cycle which produces a portion of power from a high operating temperature fluid and which produces another portion of the power from a lower operating temperature fluid.

Still another object of the present invention is to provide a plurality of power delivery devices each receiving energy from a common energy source and to provide one or more of the power delivery devices with energy transfer means to transfer a portion of the unused energy expelled from one of the power delivery devices to the input of another power delivery device.

Yet another object of the present invention is to provide a binary Rankine cycle with a heat energy source sufficiently large to deliver all of the heat energy necessary for the operation of each Rankine cycle independent of the other, should one of the Rankine cycles become inoperative.

A still further object of the present invention is to provide a binary Rankine cycle with cooling means sufficiently large to reject all of the unwanted heat energy from each of the Rankine cycles independent of the other should one of the Rankine cycles become inoperative.

The single figure shows a diagram which illustrates schematically the preferred arrangement of a series of heat exchangers and condensers which form a binary Rankine cycle to convert heat energy to electrical energy.

The redundant binary power delivery system of the present invention has a boiler 10 which serves to provide heat energy to two separate fluid circulatory systems 12 and 13. A third circulatory system 15 serves as a cooling system to remove unwanted heat energy from the circulatory systems 12 and 13. The circulatory system 15 will remove a sufficient amount of heat from the fluid in each of the circulatory systems 12 and 13 to provide the necessary condensation for the operation of the Rankine cycle. The circulatory systems 12, 13 and 15 can be considered as closed loops since the fluid in each of the loops is continuously cycled through the respective loop during the operation of the system. By way of example and not by way of limitation, the circulating fluid in loop 12 is of mercury, while the circulating fluid in loop 13 is water. The circulating fluid in the cooling loop 15 may be of any desired coolant. Also, by way of example, the boiler 10 may be provided with a heat storage salt such as lithium fluoride.

The loop 12 has a heat exchanger 16 located within the boiler 10 for receiving heat energy therefrom sufficient to vaporize the mercury in the heat exchanger 16. Connected to the output of the heat exchanger 16 is a prime mover 18, which is preferably a turbine. Rotatably coupled to the turbine 18 is an alternator 19 for producing electrical power. The fluid exhaust of turbine 18 is connected to a heat transfer device 20 which is located within a boiler condenser 22. The output of heat transfer device 20 is connected to the input of a heat transfer device 25 located within a regenerator 26, and the output of the device 25 is connected to the input of another heat transfer device 28 located within a sub-cooler condenser 29. The condensate produced by the heat transfer device 28 is delivered to an accumulator 30 which serves to accumulate the fluid in loop 12 substantially in liquid form. The output of the device 28 and of the accumulator 30 are connected to the input of a pump 32, which is preferably rotatably coupled to the turbine 18. Connected to the output of the pump 32 is a heat receiving element 34 which forms a part of the regenerator 26. The fluid passing through the heat receiving element 34 is preheated before it is applied to the heat exchanger 16 in the boiler 10, thereby increasing the efficiency of the loop 12.

The loop 13 has a heat exchanger 35 located within the boiler 10 for receiving heat therefrom. The output of the heat exchanger 35 is connected to a prime mover 36, which is preferably a turbine. Rotatably coupled to the turbine 36 is an alternator 37 for producing electrical power. It may be noted, that the alternators 19 and 37 may be replaced by other power delivery means such as hydraulic pumps or the like. The fluid output of turbine 36 is connected to a heat transfer element 40 which forms a part of a condenser 41.

Connected to the output of the element 40 is an accumulator 43 which receives the condensate from the element 40 and stores the fluid in the loop 13 in substantially a liquid form. The output of element 40 and of the accumulator 43 are connected to a pump 44, which is rotatably coupled to the turbine 36. Connected to the output of pump 44 is a heat receiving element 45 which is a part of the boiler condenser 22. The fluid in the element 45 is preheated by means of the hot exhaust fluid from the turbine 18 passing through the heat transfer element 20. The preheated fluid in the heat receiving element 45 is preheated by means of the hot exhaust fluid from the turbine 18 passing through the heat transfer element 20. The preheated fluid in the heat receiving element 45 is delivered to the heat exchanger 35 in the boiler 10.

The cooling loop 15 is provided with a pump 47 to pump coolant fluid in the loop to a heat receiving element 48 which is part of the condenser 41. The output of the heat receiving element 48 is connected to the input or heat receiving element 50 which is part of the sub-cooler condenser 29. The output of the heat receiving element 50 is then preferably connected to a radiator 51 which serves to give off the unwanted heat energy received by the heat receiving elements 48 and 50.

In the operation of the redundant binary power system of the present invention, a high temperature fluid such as mercury is heated to a vapor state in the heat exchanger 16 and, simultaneously, a low temperature fluid such as water is heated to a vapor state in the heat exchanger 35. The mercury vapor from heat exchanger 16 is then applied to the turbine 18 to produce rotational movement therein to generate electrical power from the alternator 19. The mercury vapor at the exhaust of turbine 18 still possesses a considerable amount of heat energy. The heat energy from the exhaust of turbine 18 is then applied through the heat transfer element 20 which transfers a portion of the heat energy therein to the heat receiving element 45, thereby preheating and boiling the low temperature fluid in loop 13. The somewhat cooled mercury vapor from heat transfer element 20 is then applied through the heat transfer element 25 whereby the heat energy therefrom is transferred to the heat receiving element 34 to preheat the mercury en route to the heat exchanger 16. Under normal operating conditions, to insure adequate subcooling of the mercury in loop 12, the somewhat cooled mercury from the heat transfer element 25 is then applied to the heat transfer element 28. The condensate formed by the heat transfer element 28 is then accumulated in substantially a liquid form by the accumulator 30. The high temperature Rankine cycle is continuously repeated by pumping the mercury from the accumulator 30 through the pump 32 and into the heat receiving element 34, which receives the heat energy from the heat transfer element 25. The preheated mercury in the heat receiving element 34 is then delivered to the heat exchanger 16 wherein the mercury is supplied with a sufficient amount of heat energy to vaporize the mercury.

As mentioned hereinabove, vaporization of the fluid in loop 13 is completed and possibly superheated in the heat exchanger 35. Under normal operating conditions, the fluid in loop 13 is vaporized in the heat exchanger 45 which is part of the condenser boiler 22; therefore, the operation of the Rankine cycle of the low temperature fluid within the loop 13 can be considered to be taking place simultaneously with the operation of the Rankine cycle of the high temperature fluid. The water vapor is then delivered to the turbine 36 to cause rotational movement therein to produce electrical energy from the alternator 37. The heated water vapor from the fluid exhaust of the turbine 36 is then passed through the heat transfer element 40 of the condenser 41. The condensate formed by the element 40 is accumulated by the accumulator 43 in substantially a liquid form. As the turbine 36 rotates, the pump 44 will receive water from the accumulator 43 and deliver the water to the heat receiving element 45 which receives heat energy from the heat transfer element 20 of the boiler condenser 22. Under normal operating conditions, this will condense the mercury vapor exhausting from the turbine 18 and boil the water en route to heat exchanger 35. The vaporized water in the heat receiving element 45 is then delivered to the heat exchanger 35 where additional heat energy is applied to complete the water vaporization and to provide superheat if desired. The steam is then applied to the turbine 36 to repeat the Rankine cycle of the low temperature loop 13.

The coolant in the cooling loop 15 serves to receive unwanted heat from the Rankine cycle of the low temperature loop 13 and of the high temperature loop 12. The coolant is circulated through the cooling loop 15 by the pump 47. The coolant first passes through the heat receiving element 48 which receives heat energy from the condenser element 40, thereby producing condensate in the condenser element 40. The coolant is then delivered to the heat receiving element 50 which receives heat energy from the heat transfer element 28 of the sub-cooler condenser 29, thereby producing subcooling in the element 28. The coolant in the heat receiving element 50 is then delivered to a radiator element 51 which radiates or otherwise gives off the heat energy received by the coolant from the condenser elements 28 and 40.

In the preferred embodiment of the present invention, the sub-cooler condenser 29 is sufficiently large to be capable of removing all of the unwanted heat energy from the high temperature fluid circulating within the loop 12. Therefore, if that portion of heat energy from the exhaust of the turbine 18 is not transferred by the boiler condenser 22 into the water passing through the heat receiving element 45, this portion of heat energy will be transferred to the coolant passing through the heat receiving element 50. This feature provides increased reliability of the power delivery system. If the Rankine cycle of the low temperature loop becomes inoperative and the water in the loop ceases to pass through the boiler condenser 22, the heat energy which is normally transferred to the water in the boiler condenser 22 will not be transferred. However, this heat energy is unwanted in the condensation portion of the Rankine cycle and is therefore transferred to the coolant in the cooling loop 15 by the sub-cooler condenser 29.

Also in the preferred embodiment of the present invention, the boiler 10 is sufficiently large to completely boil and superheat the water in the low temperature loop 13 without the need of preheating and preboiling the water before delivering it to the heat exchanger 35. Therefore, if that portion of heat energy from the exhaust of the turbine 18 is not transferred by the boiler condenser 22 into the water passing through the heat receiving element 45, this portion of heat energy will be put into the water by the boiler 10. This is another important feature of which provides increased reliability of the power delivery system. If the Rankine cycle of the high temperature loop 12 is stopped and the mercury in the loop ceases to pass through the boiler condenser 22, and the heat energy which is normally transferred into the water of the low temperature loop is not transferred, therefore not preheating and preboiling the water which is delivered to the heat exchanger 35, the heat exchanger 35 is of adequate size to accomplish the boiling and superheating requirements.

By adjustment of the temperature and pressure of the fluid circulating within the loops 12 and 13, the division of power in the binary Rankine cycle can be altered. For the purpose of illustration, assume that one-half of the power is delivered by the high temperature loop and one-half of the power is delivered by the low temperature loop. Under these conditions, failure of either of the loops of the power delivery system would result in a loss of power of only 50% of the total capacity. Because of the capacity of either loop 12 or 13 to deliver power independently of the other loop, the power delivery system can be placed into operation easily.

Although the power delivery system of the present invention is primarily concerned with using different fluids for the Rankine cycle of separate loops, it should not be construed in limiting sense. The binary Rankine cycle of the present invention may utilize the same fluid in separate loops whereby the fluid in one loop is operated at a higher temperature than the fluid in the other loop. Also, it will be understood that more than two Rankine cycle loops may be provided, and that other modifications and variations may be effected without departing from the spirit and scope of the novel concepts of this invention.

What is claimed is:

1. A power delivery system comprising, a heat energy source, first and second heat exchanger means carried by said energy source, first and second turbines each having a fluid intake and a fluid exhaust, means defining a first fluid carrying loop between said first heat exchanger means and said first turbine for carrying heated fluid from said first heat exchanger means to said intake of said first turbine and for carrying fluid from said exhaust of said first turbine back to said first heat exchanger means, means defining a second fluid carrying loop between said second heat exchanger means and said second turbine for carrying heated fluid from said second heat exchanger means to said intake of said second turbine and for carrying fluid from said exhaust of said second turbine back to said second heat exchanger means, heat transfer means at the exhaust of said first turbine to transfer unused heat energy therefrom to the fluid in said second fluid carrying loop, means defining a third fluid carrying loop connected in heat sensing relation with said first and second fluid carrying loops at said exhaust of said first and second turbines for cooling the fluid from said first and second turbines, power utilization means, and first and second power output means driven by said first and second turbines respectively for providing power to said power utilization means.

2. A power delivery system comprising, a heat energy source, first and second heat exchanger means carried by said energy source, first and second prime movers each having a fluid intake means and a fluid exhaust means, means defining a first fluid carrying loop between said first heat exchanger means and said first prime mover, means defining a second fluid carrying loop between said second heat exchanger means and said second prime mover, cooling means formed by a third fluid carrying loop and including heat radiator means, pump means in said first and second loops between said said fluid exhaust means and said heat exchanger means for circulating the fluid in their respective loops, a first heat transfer means in said first loop between said fluid exhaust means of said first prime mover and said pump means in the loop for transferring a portion of the heat from the fluid which is entering said pump to the fluid in said second loop which is entering said second heat exchanger means, a second heat transfer means in said first loop between said first heat transfer means and said pump means in the loop for transferring a portion of the heat from the fluid which is entering said pump means to the fluid which is leaving said pump means, a third heat transfer means in said first loop between said second heat transfer means and said pump means in the loop for transferring an additional portion of the heat from the fluid which is entering said pump means to said cooling means, a fourth heat transfer means in said second loop between said fluid exhaust means of said second prime mover and said pump means in the loop for transferring heat from the fluid which is entering said pump means to said cooling means, power utilization means, and first and second power output means driven by said first and second prime movers respectively for providing power to said power utilization means.

3. A power delivery system comprising, a first and second heat exchanger means, first and second power delivery means each having a fluid intake and a fluid exhaust, means defining a first fluid carrying loop between said first heat exchanger means and said first power delivery means for carrying high temperature fluid from the heat exchanger means to said intake of the power delivery means and for carrying the high temperature fluid from said exhaust of the power delivery means back to the heat exchanger, means defining a second fluid carrying loop between said second heat exchanger means and said second power delivery means for carrying a low temperature fluid from the heat exchanger to said intake of the power delivery means and for carrying the low temperature fluid from said exhaust of the power delivery means back to the heat exchanger, heat transfer means in said first loop between said fluid exhaust means of said first power delivery means and said first heat exchanger means for transferring a portion of the heat energy from the high temperature fluid which is entering the first heat exchanger means to the low temperature fluid entering said second heat exchanger means of said second loop, and a heat energy source connected to said first and second heat exchanger means which is sufficiently large to provide all the heat energy necessary to operate said second fluid carrying loop during the non-performance of said first fluid carrying loop.

4. A power delivery system comprising, a heat energy source, first and second heat exchanger means carried by said energy source, first and second power delivery means each having a fluid intake and a fluid exhaust, means defining a first fluid carrying loop between said first heat exchanger means and said first power delivery means for carrying high temperature fluid from the heat exchanger to said intake of the power delivery means and for carrying the high temperature fluid from said exhaust of the power delivery means back to the heat exchanger, means defining a second fluid carrying loop between said second heat exchanger and said second power delivery means for carrying low temperature fluid from the heat exchanger to said intake of the power delivery means and for carrying the low temperature fluid from said exhaust of the power delivery means back to the heat exchanger, heat transfer means in said first loop between said fluid exhaust means of said first power delivery means and said first heat exchanger means for transferring a portion of the heat from the high temperature fluid which is entering said first heat exchanger to the low temperature fluid which is entering said second heat exchanger means of said second loop, and cooling means connected to said first and second fluid carrying loops for cooling the fluid in the loops, said cooling means being sufficiently large to completely cool the fluid in said first fluid carrying loop during the non-performance of said second fluid carrying loop.

5. A power delivery system comprising: a heat energy source; first and second heat exchanger means carried by said energy source; first and second prime movers each having a fluid intake means and a fluid exhaust means; means defining a first fluid carrying loop between said first heat exchanger means and said first prime mover; means defining a second fluid carrying loop between said second heat exchanger means and said second prime mover; first and second accumulator means connected in fluid communication with said first and second fluid carrying loops respectively for maintaining the fluid in each of the said loops at a constant pressure; power utilization means; and first and second power output means driven by said first and second prime movers respectively for delivering power to said power utilization means.

References Cited by the Examiner

UNITED STATES PATENTS

| | | | |
|---|---|---|---|
| 1,993,585 | 3/1935 | Bauman et al. | 60—49 X |
| 2,214,817 | 9/1940 | Harrington | 60—52 X |
| 3,220,191 | 11/1965 | Berchtold | 60—59 |

FOREIGN PATENTS

| | | |
|---|---|---|
| 546,275 | 7/1942 | Great Britain. |

EDGAR W. GEOGHEGAN, *Primary Examiner.*